United States Patent
Gao et al.

(10) Patent No.: US 11,258,574 B2
(45) Date of Patent: Feb. 22, 2022

(54) METHODS AND APPARATUSES FOR REFERENCE SIGNAL ALLOCATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/486,106

(22) PCT Filed: Mar. 31, 2017

(86) PCT No.: PCT/CN2017/079083
§ 371 (c)(1),
(2) Date: Aug. 14, 2019

(87) PCT Pub. No.: WO2018/176401
PCT Pub. Date: Oct. 4, 2018

(65) Prior Publication Data
US 2020/0235899 A1 Jul. 23, 2020

(51) Int. Cl.
*H04B 7/06* (2006.01)
*H04L 5/00* (2006.01)
(Continued)

(52) U.S. Cl.
CPC .............. *H04L 5/10* (2013.01); *H04B 7/0626* (2013.01); *H04L 5/0051* (2013.01); *H04L 25/0226* (2013.01)

(58) Field of Classification Search
None
See application file for complete search history.

(56) References Cited

U.S. PATENT DOCUMENTS

2013/0064147 A1  3/2013  Takamatsu
2013/0265955 A1* 10/2013  Kim ................ H04W 72/02
                                                      370/329
(Continued)

FOREIGN PATENT DOCUMENTS

CN        101801097 A    8/2010
CN        103167615 A    6/2013
(Continued)

OTHER PUBLICATIONS

International Search Report for PCT/CN2017/079083 dated Dec. 29, 2017.
(Continued)

*Primary Examiner* — Scott M Sciacca
(74) *Attorney, Agent, or Firm* — Sughrue Mion, PLLC (57) ABSTRACT

Embodiments of the present disclosure relate to methods and devices for reference signal allocation. In example embodiments, a method implemented in a network device is provided. According to the method, a plurality of RS configurations are determined based on at least one of the following: different RS ports, or different RS sequences of a same type. At least one first RS configuration from the plurality of RS configurations are allocated for uplink RS transmission by a terminal device served by the network device, and at least one second RS configuration from the plurality of RS configurations are allocated for downlink RS transmission by the network device.

4 Claims, 9 Drawing Sheets

(51) Int. Cl.
*H04W 72/04* (2009.01)
*H04L 5/10* (2006.01)
*H04L 25/02* (2006.01)

(56) References Cited

U.S. PATENT DOCUMENTS

| | | | |
|---|---|---|---|
| 2015/0263796 A1* | 9/2015 | Nam | H04B 7/0452 370/329 |
| 2016/0080963 A1* | 3/2016 | Marinier | H04W 24/08 370/252 |
| 2017/0331645 A1* | 11/2017 | Baligh | H04L 5/0051 |
| 2018/0062724 A1* | 3/2018 | Onggosanusi | H04B 7/0626 |
| 2020/0022122 A1* | 1/2020 | Wu | H04L 5/0023 |
| 2020/0106584 A1* | 4/2020 | Jiang | H04L 1/001 |

FOREIGN PATENT DOCUMENTS

| | | |
|---|---|---|
| CN | 103703848 A | 4/2014 |
| WO | 2014/127511 A1 | 8/2014 |

OTHER PUBLICATIONS

Communication dated Nov. 24, 2020 from the Japanese Patent Office in Application No. 2019-552841.

* cited by examiner

METHODS AND APPARATUSES FOR REFERENCE SIGNAL ALLOCATION

CROSS REFERENCE TO RELATED APPLICATIONS

This application is a National Stage of International Application No. PCT/CN2017/079083 filed Mar. 31, 2017.

TECHNICAL FIELD

Embodiments of the present disclosure generally relate to the field of telecommunication, and in particular, to methods and apparatuses for reference signal (RS) allocation in uplink and downlink.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as beam management, reference signal transmission, and so on, are studied for new radio access.

Conventionally, a network device (for example, an eNB) transmits downlink reference signals (RSs) such as Demodulation Reference Signal (DMRS), Channel State Information-Reference Signal (CSI-RS), Sounding Reference Signal (SRS), and the like. A terminal device, such as user equipment (UE) in the system may receive the downlink reference signals on allocated resources, including for example, one or more resource elements (REs). The terminal device may also transmit uplink reference signals to the network device on corresponding allocated resources. The downlink and uplink reference signals may be used for channel estimation, demodulation, and the like at the receiving terminal device and network device sides.

As increasing of the number of available antenna ports and development of the communication technologies, new requirements are imposed on downlink and uplink transmission of reference signals, for example, structures designed for the downlink and uplink reference signals, sequences used in downlink and uplink reference signals, resource allocated for the downlink and uplink reference signals, and the like.

SUMMARY

In general, example embodiments of the present disclosure provide methods and apparatuses for reference signal (RS) allocation in uplink and downlink.

In a first aspect, there is provided a method implemented in a network device. According to the method, a plurality of RS configurations are determined based on at least one of the following: different RS ports, or different RS sequences of a same type. At least one first RS configuration from the plurality of RS configurations are allocated for uplink RS transmission by a terminal device served by the network device, and at least one second RS configuration from the plurality of RS configurations are allocated for downlink RS transmission by the network device.

In a second aspect, there is provided a method implemented in a terminal device. According to the method, information on at least one first RS configuration among a plurality of RS configurations is received from a network device. The plurality of RS configurations being determined based on at least one of the following: different RS ports, or different RS sequences of a same type, and at least one second RS configuration among the plurality of RS configurations being allocated for downlink RS transmission by the network device. A RS sequence is transmitted to the network device based on the at least one first RS configuration.

In a third aspect, there is provided a network device. The network device includes a controller configured to determine a plurality of RS configurations based on at least one of the following: different RS ports, or different RS sequences of a same type; allocate at least one first RS configuration from the plurality of RS configurations for uplink RS transmission by a terminal device served by the network device; and allocate at least one second RS configuration from the plurality of RS configurations for downlink RS transmission by the network device.

In a fourth aspect, there is provided a terminal device. The terminal device includes a receiver configured to receive from a network device information on at least one first RS configuration among a plurality of RS configurations, the plurality of RS configurations being determined based on at least one of the following: different RS ports, or different RS sequences of a same type, and at least one second RS configuration among the plurality of RS configurations being allocated for downlink RS transmission by the network device. The terminal device also includes a transmitter configured to transmit a RS sequence to the network device based on the at least one first RS configuration.

In a fifth aspect, there is provided a device. The apparatus includes a processor; and a memory coupled to the processing unit and storing instructions thereon, the instructions, when executed by the processing unit, causing the apparatus to perform the method according to the first aspect.

In a sixth aspect, there is provided a device. The apparatus includes a processor; and a memory coupled to the processing unit and storing instructions thereon, the instructions, when executed by the processing unit, causing the apparatus to perform the method according to the second aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 1:
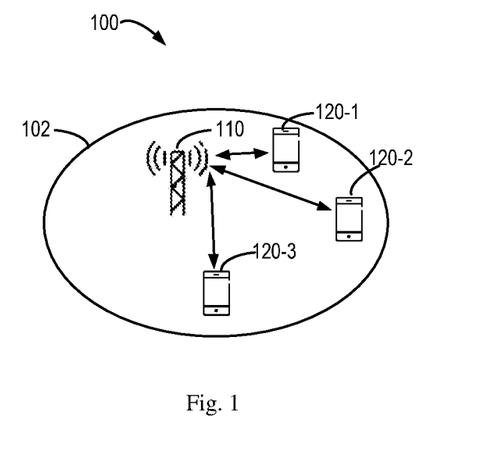
FIG. 1 is a block diagram of a communication environment in which embodiments of the present disclosure can be implemented.

FIG. 1 shows an example communication network 100 in which embodiments of the present disclosure can be implemented. The network 100 includes a network device 110 and three terminal devices 120-1 and 120-3 (collectively referred to as terminal devices 120 or individually referred to as terminal device 120) served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that there may be one or more neighboring cells adjacent to the cell 102 where one or more corresponding network devices provides service for a number of terminal device located therein.

The network device 110 may communicate with the terminal devices 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a reference signal (RS) in a broadcast, multi-cast, and/or unicast manners to one or more of the terminal devices 120 in a downlink. Similarly, one or more of the terminal devices 120 may transmit RSs to the network device 110 in an uplink. As used herein, a "downlink" refers to a link from a network device to a terminal device, while an "uplink" refers to a link from the terminal device to the network device.

The RS may be used by the receiving device(s) (the network device 110 in uplink RS transmission or the terminal devices 120 in downlink RS transmission) for channel estimation, demodulation, and other operations for communication. Generally speaking, a RS is a signal sequence that is known by both the network device 110 and the terminal devices 120. For example, a RS sequence may be generated and transmitted by a transmitting device (the network device 110 or the terminal device 120) based on a certain rule and a receiving device (the terminal device 120 or the network device 110) may deduce the RS sequence based on the same rule. Examples of reference signal may include but are not limited to Demodulation Reference Signal (DMRS), Channel State Information-Reference Signal (CSI-RS), Sounding Reference Signal (SRS).

In transmission of downlink and uplink reference signals, the network device 110 may assign corresponding resources for the transmission and/or specify which sequence is transmitted. In Multiple-Input Multiple-Output (MU-MIMO) scenarios, both the network device 110 and terminal device 120 are equipped with multiple antenna ports (or antenna elements) and can transmit specified RS sequences on a certain resource region using the antenna ports (antenna elements). A number of RS ports are also specified. A RS port may be referred to as a specific mapping of part or all of a RS sequence to one or more resource elements of a resource region allocated for RS transmission in time, frequency, and/or code domains and thus can also be called as a virtual RS port. Generally, different RS ports are orthogonal to each other. In order to transmit downlink and uplink RSs, the network device 110 can allocate one or more corresponding RS ports for downlink RS transmission and one or more other corresponding RS ports for uplink RS transmission.

For example, it has been agreed in 3GPP specification works that a terminal device can support up to eight RS ports and thus can be allocated with less than or equal to eight RS ports for uplink transmission. The network device can also transmit a RS sequence to the terminal device with at most eight RS ports.

With the development of new communication technologies, the number of orthogonal RS ports can be increased due to increasing of antenna ports of network devices and terminal devices and/or use of wide frequency bands. For example, it has been proposed to specify more than eight orthogonal RS ports for RS transmission (especially DMRS transmission). New requirements are thus imposed on downlink and uplink RS transmissions. For flexible duplexing and interference cancellation, a common RS structure is needed for downlink and uplink, which means that the resource location, the pattern and sequences for downlink and uplink RS transmission are common while the orthogonality may also be satisfied. In other words, reference signals for both downlink and uplink can be configured to be orthogonal to each other. The increasing of orthogonal RS ports is more suitable for Multi-User Multiple-Input Multiple-Output (MU-MIMO) scenarios and thus it is desired that multiplexing of different terminal devices or RS transmission in different links can be supported with the RS ports in MU-MIMO systems.

Figure 2:
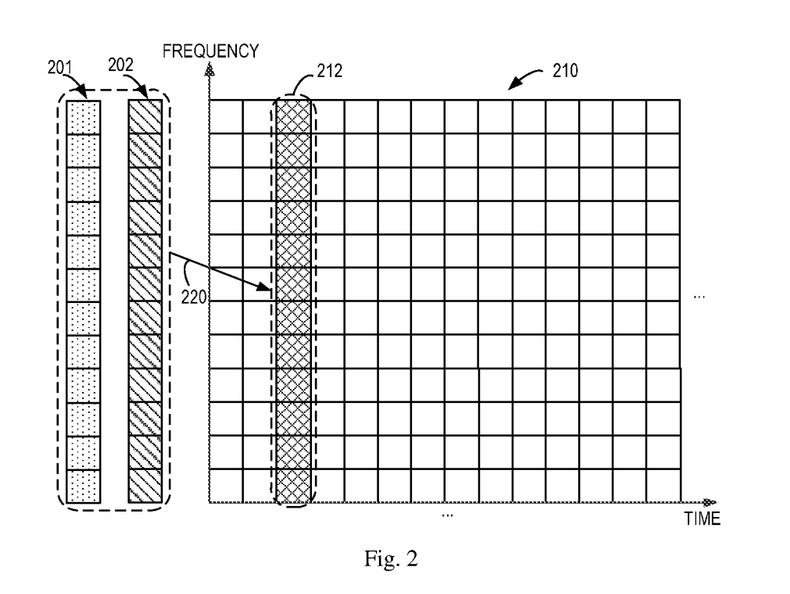
FIG. 2 is an illustrative diagram showing multiplexing of different reference signals.

FIG. 2 shows a diagram for such new requirements. As shown, RS transmission is allocated with a resource region 212 in a resource space 210 (a time and frequency resource space in this example). The resource region 212 may correspond to a number of orthogonal RS ports with corresponding resource mapping. For two RS sequence 201 and 202 (downlink and/or uplink RS sequences for one or more terminal devices), it is desired that they can be multiplexed (220) to the resource region 212 (via corresponding RS ports).

However, according to current communication specifications, downlink and uplink RSs are separately designed and cannot meet the new requirements. For example, according to current Long Term Evolution (LTE) specification, a downlink DMRS is generated with a pseudorandom noise (PN) sequence and are multiplexed among multiple antenna ports of a network device using Code Division Multiple (CDM) and Frequency Division Multiple (FDM) techniques; while an uplink DMRS is generated with a Zadoff-Chu (ZC) sequence and are multiplexed among multiple antenna ports of a network device using cyclic shift (CS), CDM, and Interleaved Frequency Division Multiple Access (IFDMA) techniques. Therefore, downlink and uplink RS sequences designed according to current specifications cannot be multiplexed in the same resource region (or with a same set of RS ports).

In accordance with embodiments of the present disclosure, there is proposed a new solution for RS allocation. In this solution, a plurality of RS configurations are determined by a network device based on different RS ports and/or different RS sequences of a same type. To enable downlink and uplink RS transmissions, the network device may allocate a subset of the determined RS configurations for its downlink RS transmission and another subset of the determined RS configurations for uplink RS transmission by a terminal device served by the network device. The network device may thus transmit a downlink RS sequence to one or more terminal devices based on the allocated RS configuration while the terminal device may also transmit an uplink RS sequence based on its allocated RS configuration. Through this solution, since RS ports are defined as orthogonal to each other and RS sequences of the same type are generated to be at least quasi-orthogonal to each other, the set of RS orthogonal configurations can be obtained from the RS ports and RS sequences. On this basis, downlink and uplink RSs transmitted with the allocated RS configuration can share a common structure and achieve orthogonality.

Figure 3:
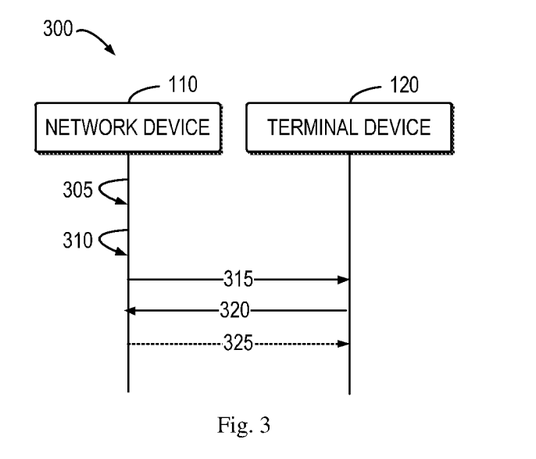
FIG. 3 is a flowchart illustrating a process for reference signal allocation according to some embodiments of the present disclosure.

Principle and implementations of the present disclosure will be described in detail below with reference to FIG. 3, which shows a process 300 for reference signal allocation according to an embodiment of the present disclosure. For the purpose of discussion, the process 300 will be described with reference to FIG. 1. The process 300 may involve the network device 110 and one or more terminal devices 120 served by the network device 110.

The network device 110 determines (305) a plurality of RS configurations based on at least one of the following: different RS ports, or different RS sequences of a same type. As used herein, a RS configuration is used to specify one or more aspects of transmission of a reference signal, for example, a RS port to be used for transmission, and/or a sequence to be generated for transmission.

A RS port may be referred to as a specific mapping of part or all of a RS sequence to one or more resource elements of a resource region allocated for RS transmission in time, frequency, and/or code domains. In some embodiments, a RS port may be defined by a matrix representing multiple antennas multiplying by a pre-coder matrix representing the mapping. Therefore, if one or more certain RS ports are selected for transmission, the resource mapping for the RS sequence can be determined. In some use cases, a RS port may also be called as a virtual RS port or a resource mapping between one or more antenna ports and one or more resource elements. Generally, a plurality of different RS ports can be specified for a certain resource region for RS transmission. These RS ports are orthogonal to each other. Therefore, in embodiments of the present disclosure, each of the different RS ports can be regarded as a corresponding RS configuration.

In some embodiments, different RS sequences of a same type can be used to define the RS configurations. For example, each of the different RS sequences can be considered as a different RS configuration. Generally, RS sequences of the same type may be designed to achieve at least quasi-orthogonality. In some embodiments, different RS sequences of the same type can be generated based on a same generation rule. For example, different sequences of the same type may be generated based on a same formula with different initial value, a same formula with different root indices, different cyclic shift values of a same root sequence, and/or different transformations on a same sequence (for example, frequency rotations). Various methods of sequence generations may be utilized for generating the RS sequences based on the same root sequence, the same initial value, the same cyclic shift, and/or the same transformation on a sequence. In some examples, the RS sequences may all be pseudorandom noise (PN) sequences, Zadoff-Chu (ZC) sequences, or the like.

In some other embodiments, the RS configurations may be defined by both RS ports and RS sequences of the same type. For example, for two different RS configurations, the same RS port may be assigned and then two different sequences are specified. In other examples, for two different RS configurations, the same sequence may be specified while different RS ports are assigned.

The RS configurations based on the RS ports and/or RS sequences may be preset and stored in the network device 110 for use in some embodiments. In other embodiments, the network device 110 may determine the RS configurations dynamically (in real time) according to a certain rule (different RS ports, or different RS sequences, or both) when there are downlink and uplink RSs to be transmitted.

Since the plurality of RS configurations defined by different RS ports and/or different RS sequences of the same type are orthogonal or at least quasi-orthogonal to each other, RS transmissions in different links (for example, downlink and uplink) can share these RS configurations. Specifically, the network device 110 allocates (310) at least one first RS configuration from the plurality of RS configurations for uplink RS transmission by the terminal device 120 and at least one second RS configuration from the plurality of RS configurations for downlink RS transmission by the network device 110 itself. In this sense, both downlink and uplink RS transmissions share a common structure and can be orthogonal or quasi-orthogonal to each other. All the first RS configurations may be different from the second RS configurations, or may be partially or totally overlapped with the second RS configurations. That is, some or all of the first RS configurations for uplink RS transmission may be the same as the second RS configurations for downlink RS transmission.

The network device 110 may select from the plurality of RS configurations one or more first RS configurations for uplink RS transmission by the terminal device 120 and select one or more second RS configurations for the downlink RS transmission by the network device 110. In some embodiments, the network device 110 may select different RS configurations for uplink and downlink RS transmissions.

In some embodiments, when allocating RS configuration(s) for the uplink RS transmission, the network device 110 may consider the capability of the terminal device 120. The capability may be associated with a maximum number of antenna ports or antenna elements of the terminal device 120, and/or a maximum rank of a channel matrix between the network device and the terminal device. The number of the first RS configuration(s) may be less than or equal to the maximum number of antenna ports or antenna elements or the maximum rank of the channel matrix, in order to avoid redundancy.

When allocating RS configuration(s) for the downlink RS transmission, the network device 110 may also consider the capability of a terminal device (which may be the one with uplink RS transmission and/or another terminal device 120 served by the network device 110). For example, the number of the second RS configuration(s) may be less than or equal to a maximum number of antenna ports or antenna elements of the terminal device receiving the downlink RS, or a maximum rank of the channel matrix for the terminal device.

In some other embodiments, in addition to sharing of the same set of RS configurations between different links or as an alternative, RS transmissions with different requirements (for example, different terminal devices) can also share the determined RS configurations. In these embodiments, the network device 110 may allocate at least one third RS configuration from the plurality of RS configurations for uplink RS transmission by a further terminal device 120. For downlink RS transmissions, the network device 110 may also allocate at least one fourth RS configuration from the plurality of RS configuration for downlink RS transmission to a further terminal device.

To enable the terminal device 120 to transmit a RS in uplink, the network device 110 transmits (315) to the terminal device 120 information on the at least one first RS configuration allocated for uplink RS transmission. The information may indicate to the terminal device 120 one or more aspects of uplink RS transmission as specified in the at least one first RS configuration. For example, depending on the allocated first RS configuration, the information may indicate to the terminal device 120 which RS port(s) and/or which RS sequence(s) are used in the uplink RS transmission.

In some other embodiments, to reduce the overhead of transmission of the information, the plurality of RS configurations may have been specified or indicated to the terminal device 120 in advance, and each of the RS configurations may be identified with corresponding configuration parameters (for example, indexes or identifiers). When the network device 110 determines to allocate one or more first RS configurations for the uplink RS transmission by the terminal device 120, the network device 110 may transmit the corresponding configuration parameters for the allocated first RS configurations to the terminal device 120, instead of transmitting the detailed information on the allocated first RS configurations.

Figure 4A:
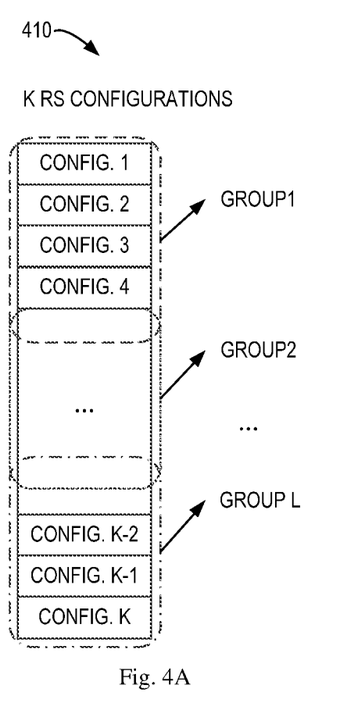
FIGS. 4A-4F are illustrative diagrams showing group division of RS configurations in accordance with some embodiments of the present disclosure.

In order to further reduce the overhead cost in indicating the first RS configurations, the plurality of the RS configurations may be divided into a plurality of groups with each of the groups being identified by a corresponding group parameter (for example, an index or identifier). For example, as shown in FIG. 4A, it is supposed that there are totally K different RS configurations (Config. 1 through Config. K) 410. The network device 110 may divide these K RS configurations into L groups each including at least one of the K RS configurations. The size of each group may be configurable. In some embodiments, one or more of RS configuration(s) included in one group may be the same as the RS configurations included in another group. That is, some of the groups may be partially overlapped with each other. In other embodiments, some of the groups may not be overlapped.

Figure 4B:
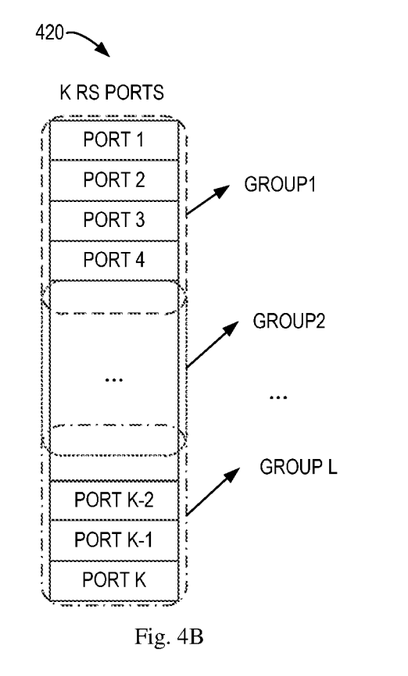
Figure 4C:
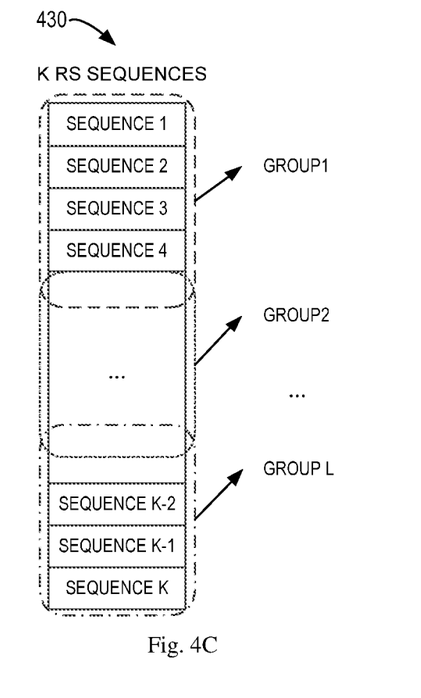

Since a RS configuration may be dependent on RS ports or RS sequences, FIGS. 4B and 4C also show the group division of RS ports and RS sequences in the case of dividing the RS configuration, where the RS ports 420 or the RS sequences 430 are divided into L groups. In these cases, each of the groups may be identified with a corresponding group parameter (or index, or identifier). For example, if there are 12 RS configurations and they are divided into 4 groups, the network device 110 may use only 2 bits to indicate the group parameter for the allocated group to the terminal device 120.

Figure 4D:
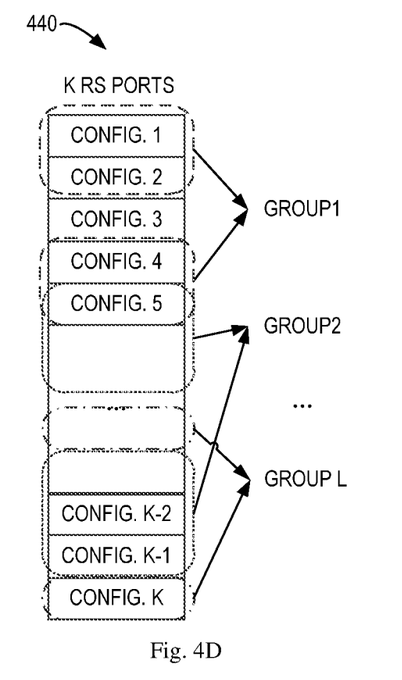

In the examples of FIGS. 4B and 4C, it is supposed that there are K RS ports and RS sequences, but it will be appreciated that the number of the RS ports and RS sequences may not be the same. In embodiments where RS configurations are defined based on both RS ports and RS sequences, the total number of RS configurations may not be the same as the number of the RS ports or RS sequences. Although the groups are shown to be divided with consecutive RS configurations (RS ports or RS sequences), in other examples, each of the groups may include discontinuous RS configurations. FIG. 4D shows such an example, where each of the L groups includes discontinuous RS ports among all the K RS ports 440.

Figure 4E:
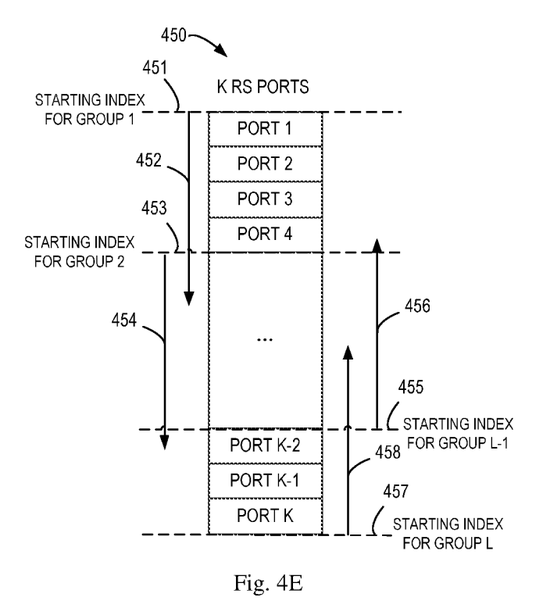
Figure 4F:
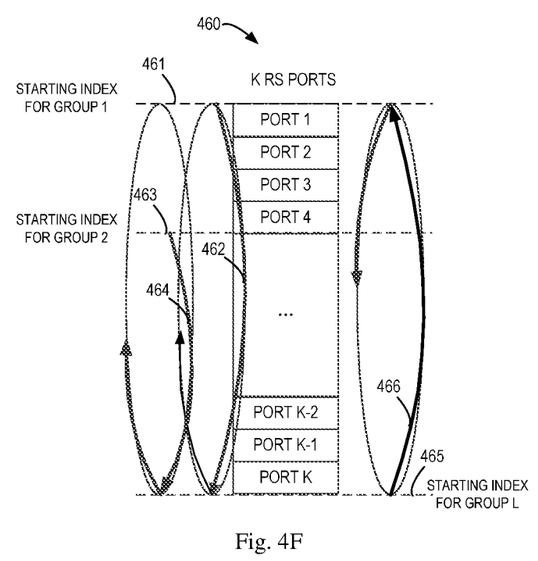

In some embodiments, the grouping of the RS configurations may be preset and stored in the network device 110 for use. In other embodiments, the network device 110 may group the RS configurations dynamically (in real time) when there are downlink and uplink RSs to be transmitted. In these embodiments of dynamic grouping, the network device 110 may determine each of the group based on the sort order of the RS configurations (especially the sort order of the RS ports). Specifically, each of the groups may be divided with different starting indexes of the RS configurations and/or different orders. FIGS. 4E and 4F shows examples of such embodiments.

As shown in FIG. 4E, K RS ports 450 may be divided into L groups. In the group division, the network device 110 may select a starting index 451 from all the indexes of RS ports 450 for Group 1, and the order of Group 1 is as indicated by 452. Similarly, the network device 110 may select a starting index 453 and an order 454 for Group 2, select a starting index 455 and an order 456 for Group L-1, select a starting index 457 and an order 458 for Group L, and the like. In some embodiments, some of the groups may be divided according to different circular sort orders. As shown in FIG. 4F, upon dividing the K RS ports 460, each of the L groups are divided with different starting indexes 461, 463, 465, and the like, and the ports included in the L groups may be selected from the K RS ports in a clockwise circular order or an anticlockwise circular order as indicated by 462, 464, 466, and the like. By dividing different groups with different starting indexes and/or different orders, in dynamical group division, the network device may be able to obtain RS groups with less overlapped RS configurations for uplink and downlink RS transmission for different terminal devices.

In some further embodiments, the network device 110 may divide all the RS configurations into two groups and allocate one for downlink RS transmission and the other one for uplink RS transmission. For each receiving terminal device 120 in downlink RS transmission, the network device 110 may then be able to select one or more of RS configurations in the group for downlink RS transmission for the terminal device. For each transmitting terminal device 120 in uplink RS transmission, the network device 110 may allocate one or more of RS configurations in the group for uplink RS transmission.

Referring back to FIG. 3, upon receipt of the information on the one or more allocated first RS configurations, the terminal device 120 transmits (320) a first RS sequence to the network device 110 based on the one or more allocated first RS configurations. The terminal device 120 may determine which RS configuration(s) will be used based on the received information and then determine how uplink RS transmission may be performed according to the allocated RS configuration(s). For example, if the one or more first RS configurations indicate that the terminal device 120 can use one or more RS ports among all the possible RS ports, then the terminal device 120 may transmit a first RS sequence using the corresponding RS ports. In this case, the first RS sequence may be generated based on certain rules that are known by both the terminal device 120 and the network device 110. As another example, if the first RS configurations indicate that the terminal device 120 can transmit one or more RS sequences among all the possible RS sequences, then the terminal device 120 may generate the corresponding RS sequence as the first RS sequences and transmit these sequences on some or all of the possible RS ports. In some other examples, the allocated first RS configurations may indicate both the RS port(s) and RS sequence(s) the terminal device 120 can used for the uplink RS transmission.

The network device 110 may transmit (325) a second RS sequence to the terminal device 120 based on the one or more allocated second RS configurations. The network device 110 may transmit the second sequence in a similar way as discussed above in the uplink RS transmission by the terminal device 120. In some other embodiments, the network device 120 may not transmit the second sequence to the terminal device 120 that transmits the first sequence in uplink, but may transmit the second sequence to a further terminal device served by the network device 110.

In some embodiments, as a receiving side in the downlink RS transmission, a terminal device 120 may be interfered by uplink RS transmission by other terminal devices 120 and/or downlink RS transmission intended for other terminal devices 120. In these cases, the network device 110 may transmit to a terminal device 120 information on RS configurations allocated for uplink RS transmission by other terminal devices 120 and/or for downlink RS transmission to be performed by the network device 120. Such information may be transmitted in a similar way as discussed at 315 with reference to FIG. 2. With the received information, the terminal device 120 may perform interference cancellation and other operations to further improve the quality of the received downlink RS. Various technologies that are currently used and to be developed in the future may be utilized for the interference cancellation based on the received information.

As a receiving side in the uplink RS transmission, the network device 110 may interfere in uplink RS transmission and downlink RS transmission of a neighboring network device in a neighboring cell. In this case, the network device 110 may transmit information on RS configurations allocated for current downlink and uplink RS transmissions in its serving cell to the network device located in the neighboring cell. The network device 110 may also receive similar information provided by the neighboring network device and utilize the information for interference cancellation.

In transmission of uplink and downlink reference signals by the network device 110 and the terminal device 120, the reference signals may be multiplexed in the resource region according to the communication techniques to be employed and the RS configurations that are allocated. FIG. 5A to 5D shows illustrative diagram of multiplexing of two different reference signals on a resource region (time and frequency). These two different reference signals may be transmitted in an uplink and a downlink, or transmitted by different terminal device in uplinks.

Figure 5A:
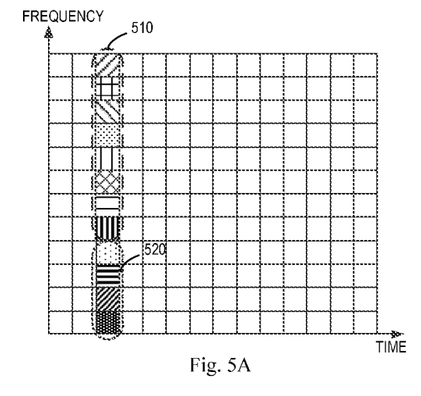
FIGS. 5A-5D show examples of multiplexing of different reference signals according to some embodiments of the present disclosure.
Figure 5B:
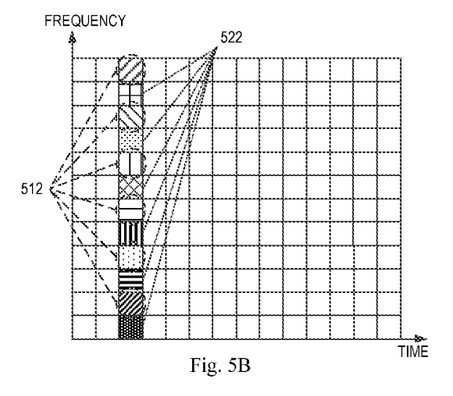
Figure 5C:
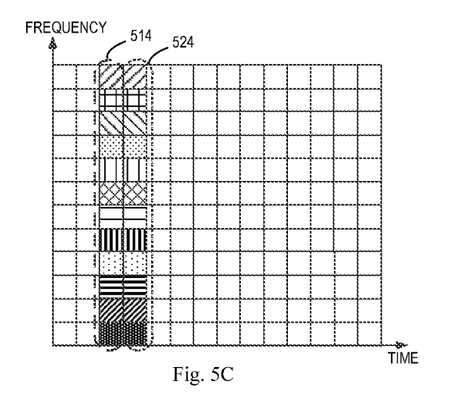
Figure 5D:
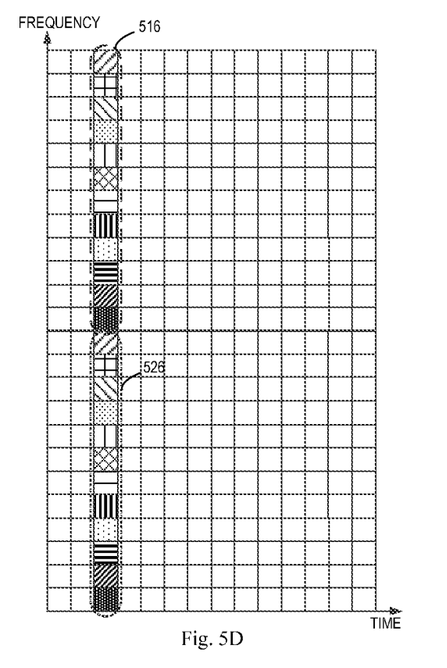

In FIG. 5A, a Frequency Division Multiple (FDM) technique is applied and thus two reference signals 510 and 520 are multiplexed in a physical resource block using different frequency resources. In FIG. 5B, an Interleaved Frequency Division Multiple Access (IFDMA) technique is applied and two reference signals 512 and 522 are interleaved in frequency domain. As shown in FIG. 5C, a Time Division Multiple (TDM) technique is applied and two reference signals 514 and 524 are multiplexed in time domain. In another example of FIG. 5D, two different signals 516 and 526 are divided in two PRBs according to the FDM techniques.

In some embodiments, the network device 110 may allocate the RS configurations periodically or upon request. In some embodiments, after the RS configurations are allocated for the uplink and downlink transmission, the network device 110 and/or the terminal device 120 may keep using the allocated RS configurations to transmit downlink and uplink RS sequences for a period of time. During this period of time, if the uplink or downlink transmission need more resources to be transmitted and additional RS configurations are not allocated, the network device 110 may employ other manners to support the uplink or downlink RS transmission.

Figure 6A:
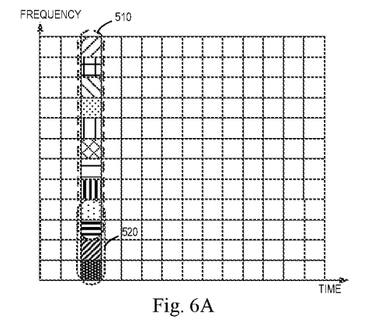
FIGS. 6A-6D show examples of extension of RS transmission according to some embodiments of the present disclosure.

In one embodiment, more RS ports allocated for other RS transmission may be configured and applied. As shown in FIG. 6A, if two reference signals 510 and 520 are previously mapped in a resource region as shown in FIG. 5A and the reference signal 510 needs more resource to be transmitted, then the reference signal 510 may be allowed to be transmitted in frequency allocated for the reference signal 520.

Figure 6B:
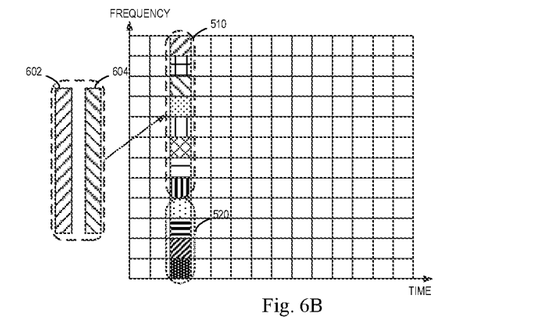
Figure 6C:
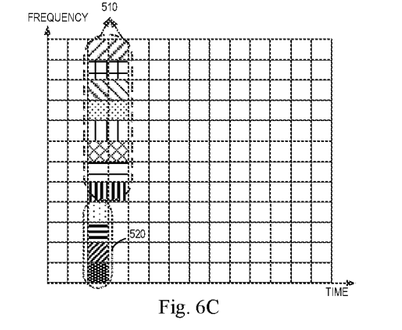

In another embodiment, as shown in FIG. 6B, different RS sequences 602 and 604 may be allocated for this reference signal 510 for transmission in the same frequency region. In yet another embodiment, the more orthogonal cover codes (in time or frequency domain) may be used with more resources (more RS ports), as shown in FIG. 6C.

Figure 6D:
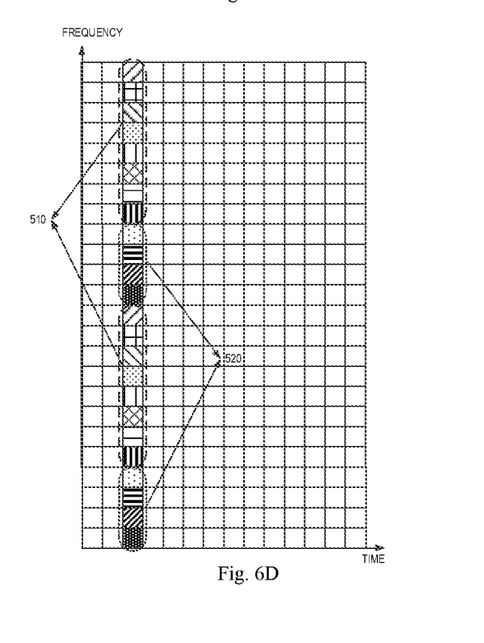

In further embodiments, the resource mapping for the reference signals may be less density in time, frequency, or code domain and more RS ports can be used so as to meet the requirement for the transmission of the reference signals. For example, as shown in FIG. 6D, the reference signals 510 and 520 occupy more frequency resources (it would be appreciated that the reference signal 520 may not necessarily be allocated with more resources if the previously allocated resources are enough for its transmission).

The RS configuration allocation has been discussed above. According to various embodiments of the present disclosure, RS configurations are defined/specified based on RS ports and/or RS sequences and can be shared by downlink and uplink RS transmissions of the network device and different terminal devices, which support flexible and dynamic RS configuration allocation for both downlink and uplink RS transmissions. The RS configuration allocation can satisfies some new requirements on the downlink and uplink RS transmissions, achieving a common structure and orthogonality for both downlink and uplink RS transmissions.

Figure 7:
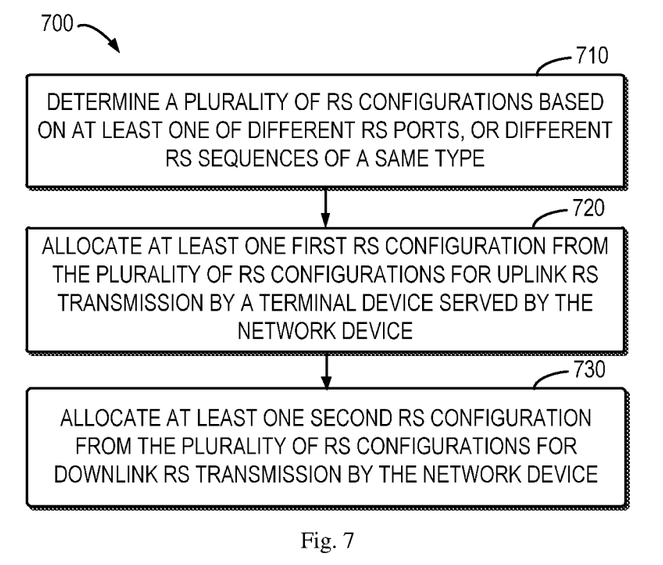
FIG. 7 shows a flowchart of an example method in accordance with some embodiments of the present disclosure.

FIG. 7 shows a flowchart of an example method 700 in accordance with some embodiments of the present disclosure. The method 700 can be implemented at a network device 110 as shown in FIG. 1. For the purpose of discussion, the method 700 will be described from the perspective of the network device 110 with reference to FIG. 1.

At block 710, the network device 110 determines a plurality of reference signal (RS) configurations based on at least one of the following: different RS ports, or different RS sequences of a same type. At block 720, the network device 110 allocates at least one first RS configuration from the plurality of RS configurations for uplink RS transmission by a terminal device served by the network device, and at block 730, the network device 110 allocates at least one second RS configuration from the plurality of RS configurations for downlink RS transmission by the network device.

In some embodiments, the method 700 may further include transmitting to the terminal device information on the at least one first RS configuration, and receiving a first RS sequence from the terminal device based on the at least one first RS configuration.

In some embodiments, allocating the at least one first RS configuration may include dividing the plurality of RS configurations into a plurality of groups, each of the plurality of groups being identified by a group parameter, and selecting a first group from the plurality of groups for the uplink RS transmission, the first group including the at least one first RS configuration. Transmitting the information may include transmitting the group parameter for the first group to the terminal device.

In some embodiments, the first RS sequence may include at least one of a demodulation reference signal (DMRS) sequence, a channel state information-reference signal (CSI-RS) sequence, or a sounding reference signal (SRS) sequence.

In some embodiments, the method 700 may further include transmitting a second RS sequence to a further terminal device served by the network device based on the at least one second RS configuration, and transmitting to the further terminal device information on the at least one first RS configuration.

In some embodiments, allocating the at least one first RS configuration to the terminal device may include allocating the at least one first RS configuration to the terminal device based on capability of the terminal device, the capability being associated with at least one of a maximum number of antenna ports or antenna elements of the terminal device, or a maximum rank of a channel matrix between the network device and the terminal device.

In some embodiments, the different RS sequences are to be generated based on different root sequences, different initial values, different cyclic shifts, or different transformations on a sequence.

In some embodiments, the method 700 may further include allocating at least one third RS configuration from the plurality of RS configurations for uplink RS transmission by a further terminal device served by the network device.

Figure 8:
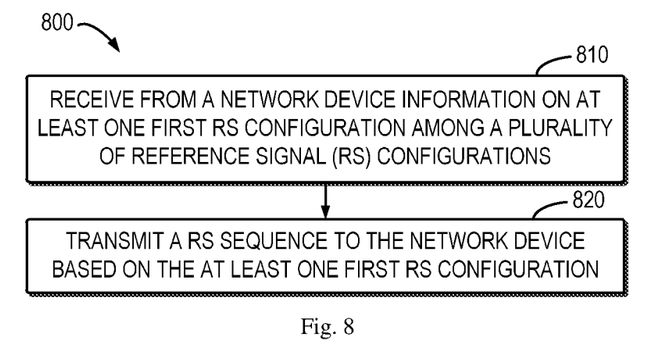
FIG. 8 shows a flowchart of an example method in accordance with some other embodiments of the present disclosure.

FIG. 8 shows a flowchart of an example method 800 in accordance with some embodiments of the present disclosure. The method 800 can be implemented at a terminal device 120 as shown in FIG. 1. For the purpose of discussion, the method 800 will be described from the perspective of the terminal device 120 with reference to FIG. 1.

At block 810, the terminal device 120 receives from a network device information on at least one first RS configuration among a plurality of reference signal (RS) configurations. The plurality of RS configurations are determined based on at least one of the following: different RS ports, or different RS sequences of a same type, and at least one second RS configuration among the plurality of RS configurations being allocated for downlink RS transmission by the network device. At block 820, the terminal device 120 transmits a RS sequence to the network device based on the at least one first RS configuration.

In some embodiments, the plurality of RS configurations may be divided into a plurality of groups, each of the plurality of groups being identified by a group parameter.

Receiving the information may include receiving from the network device the group parameter for a first group of the plurality of groups, the first group including the at least one first RS configuration.

In some embodiments, the RS sequence may include at least one of a demodulation reference signal (DMRS) sequence, a channel state information-reference signal (CSI-RS) sequence, or a sounding reference signal (SRS) sequence.

In some embodiments, the method 800 may further include receiving from the network device information on at least one third RS configuration, the at least one third RS configuration being allocated by the network device to a further terminal device for uplink RS transmission; receiving a further RS sequence transmitted by the network device based on the at least one second RS configuration; and applying interference cancellation for the further RS sequence based on the information on the at least one third RS configuration.

In some embodiments, the different RS sequences may be to be generated based on different root sequences, different initial values, different cyclic shifts, or different transformations on a sequence.

It is to be understood that all operations and features related to the network device 110 and terminal device 120 described above with reference to FIGS. 3-6D are likewise applicable to the methods 700 and 800 and have similar effects. For the purpose of simplification, the details will be omitted.

Figure 9:
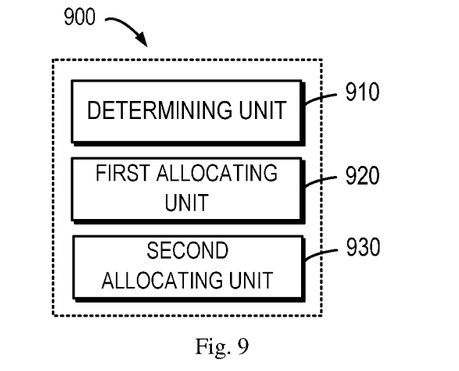
FIG. 9 is a block diagram of a network device in accordance with some embodiments of the present disclosure.

FIG. 9 shows a block diagram of an apparatus 900 in accordance with some embodiments of the present disclosure. The apparatus 900 can be considered as an example implementation of the network device 110 as shown in FIG. 1. As shown, the apparatus 900 includes a determining unit 910 configured to determine a plurality of reference signal (RS) configurations based on at least one of the following: different RS ports, or different RS sequences of a same type. The apparatus 900 also includes a first allocating unit 920 configured to allocate at least one first RS configuration from the plurality of RS configurations for uplink RS transmission by a terminal device served by the network device, and a second allocating unit 930 configured to allocate at least one second RS configuration from the plurality of RS configurations for downlink RS transmission by the network device.

In some embodiments, the apparatus 900 may further a transmitting unit configured to transmit to the terminal device information on the at least one first RS configuration, and a receiving unit configured to receive a first RS sequence from the terminal device based on the at least one first RS configuration.

In some embodiments, the first allocating unit 920 may be configured to divide the plurality of RS configurations into a plurality of groups, each of the plurality of groups being identified by a group parameter, and select a first group from the plurality of groups for the uplink RS transmission, the first group including the at least one first RS configuration. The transmitting unit may be configured to transmit the information comprises transmitting the group parameter for the first group to the terminal device.

In some embodiments, the first RS sequence may include at least one of a demodulation reference signal (DMRS) sequence, a channel state information-reference signal (CSI-RS) sequence, or a sounding reference signal (SRS) sequence.

In some embodiments, the apparatus 900 may include a further transmitting unit configured to transmit a second RS sequence to a further terminal device served by the network device based on the at least one second RS configuration, and to transmit to the further terminal device information on the at least one first RS configuration.

In some embodiments, the first allocating unit 920 may be configured to allocate the at least one first RS configuration to the terminal device based on capability of the terminal device, the capability being associated with at least one of a maximum number of antenna ports or antenna elements of the terminal device, or a maximum rank of a channel matrix between the network device and the terminal device.

In some embodiments, the different RS sequences may be to be generated based on different root sequences, different initial values, different cyclic shifts, or different transformations on a sequence.

In some embodiments, the apparatus 900 may a third allocating unit configured to allocate at least one third RS configuration from the plurality of RS configurations for uplink RS transmission by a further terminal device served by the network device.

Figure 10:
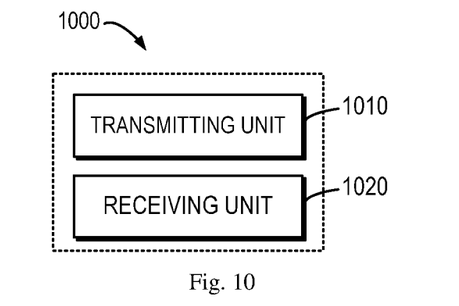
FIG. 10 is a block diagram of a terminal device in accordance with some embodiments of the present disclosure.

FIG. 10 shows a block diagram of an apparatus 1000 in accordance with some embodiments of the present disclosure. The apparatus 1000 can be considered as an example implementation of the terminal device 120 as shown in FIG. 1. As shown, the apparatus 1000 includes a receiving unit 1010 configured to receive from a network device information on at least one first RS configuration among a plurality of reference signal (RS) configurations, the plurality of RS configurations being determined based on at least one of the following: different RS ports, or different RS sequences of a same type, and at least one second RS configuration among the plurality of RS configurations being allocated for downlink RS transmission by the network device. The apparatus 1000 also includes a transmitting unit 1020 configured to transmit a RS sequence to the network device based on the at least one first RS configuration.

In some embodiments, the plurality of RS configurations may be divided into a plurality of groups, each of the plurality of groups being identified by a group parameter. Receiving the information may include receiving from the network device the group parameter for a first group of the plurality of groups, the first group including the at least one first RS configuration.

In some embodiments, the RS sequence may include at least one of a demodulation reference signal (DMRS) sequence, a channel state information-reference signal (CSI-RS) sequence, or a sounding reference signal (SRS) sequence.

In some embodiments, the receiving unit 1010 may be configured to receive from the network device information on at least one third RS configuration, the at least one third RS configuration being allocated by the network device to a further terminal device for uplink RS transmission, and receive a further RS sequence transmitted by the network device based on the at least one second RS configuration. The apparatus 1000 further includes an interference cancelling unit configured to apply interference cancellation for the further RS sequence based on the information on the at least one third RS configuration.

In some embodiments, the different RS sequences may be to be generated based on different root sequences, different initial values, different cyclic shifts, or different transformations on a sequence.

It should be appreciated that units included in the apparatuses 900 and 1000 corresponds to the blocks of the method 700 as well as the method 800. Therefore, all operations and features described above with reference to FIGS. 3-6D are likewise applicable to the units included in the apparatuses 900 and 1000 and have similar effects. For the purpose of simplification, the details will be omitted.

The units included in the apparatuses 900 and 1000 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses 900 and 1000 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 11:
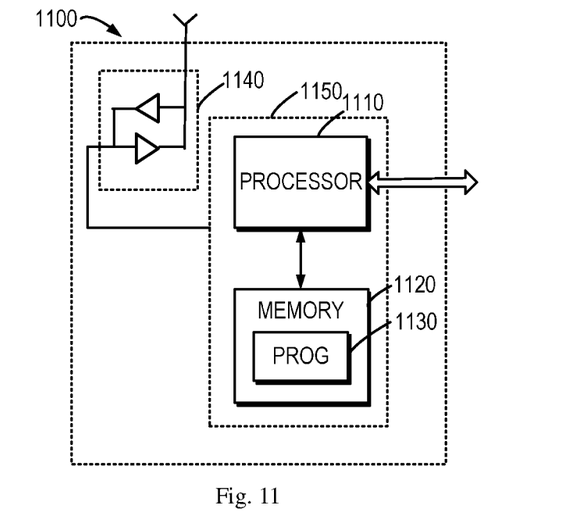
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of a network device 110 or a terminal device 120 as shown in FIG. 1. Accordingly, the device 1100 can be implemented at or as at least a part of the network device 110 or the terminal device 120.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 3 to 6D. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1110 may form processing means 1150 adapted to implement various embodiments of the present disclosure.

The memory 1110 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1110 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 3 to 6D. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising a processor configured to:
   receive, from a network device, a parameter;
   receive, from the network device, information on a Demodulation Reference Signal (DMRS) configuration indicating one or more DMRS ports and one or more DMRS sequences for a downlink DMRS transmission; and
   perform the downlink DMRS transmission between the terminal and the network device based on the DMRS configuration,
   wherein:
   12 DMRS configurations are divided into 4 groups,
   a group from the 4 groups is identified by the parameter,
   the information indicates the DMRS configuration belonging to the group identified by the parameter, and
   two different DMRS sequences are used for a same DMRS port for two different DMRS configurations.

2. A network device comprising a processor configured to:
   transmit, to a terminal, a parameter;
   transmit, to the terminal, information on a Demodulation Reference Signal (DMRS) configuration indicating one or more DMRS ports and one or more DMRS sequences for a downlink DMRS transmission; and
   perform the downlink DMRS transmission between the terminal and the network device based on the DMRS configuration,
   wherein:
   12 DMRS configurations are divided into 4 groups,
   a group from the 4 groups is identified by the parameter,
   the information indicates the DMRS configuration belonging to the group identified by the parameter, and
   two different DMRS sequences are used for a same DMRS port for two different DMRS configurations.

3. A method comprising:
   receiving a parameter;
   receiving information on a Demodulation Reference Signal (DMRS) configuration indicating one or more DMRS ports and one or more DMRS sequences for downlink DMRS transmission; and
   performing the downlink DMRS transmission based on the DMRS configuration,
   wherein:
   12 DMRS configurations are divided into 4 groups,
   a group from the 4 groups is identified by the parameter,
   the information indicates the DMRS configuration belonging to the group identified by the parameter, and
   two different DMRS sequences are used for a same DMRS port for two different DMRS configurations.

4. A method for comprising:
   transmitting a parameter;
   transmitting information on a Demodulation Reference Signal (DMRS) configuration indicating one or more DMRS ports and one or more DMRS sequences for downlink DMRS transmission; and
   performing the downlink DMRS transmission based on the DMRS configuration,
   wherein:
   12 DMRS configurations are divided into 4 groups,
   a group from the 4 groups is identified by the parameter,
   the information indicates the DMRS configuration belonging to the group identified by the parameter, and
   two different DMRS sequences are used for a same DMRS port for two different DMRS configurations.

* * * * *